United States Patent [19]
Stoy

[11] 3,953,545
[45] Apr. 27, 1976

[54] POLYMERS CONTAINING SILVER AND COPPER

[76] Inventor: Arthur Stoy, No. 7, Farni ul., Prague 6, Czechoslovakia

[22] Filed: Mar. 15, 1973

[21] Appl. No.: 341,385

Related U.S. Application Data

[60] Division of Ser. No. 114,088, Feb. 9, 1971, Pat. No. 3,734,897, which is a continuation of Ser. No. 729,897, May 17, 1968, abandoned.

[30] Foreign Application Priority Data
May 25, 1967  Czechoslovakia ................. 3821-67

[52] U.S. Cl. .................................. 260/898; 526/13; 526/23; 526/48; 526/49; 526/287; 526/342; 96/85; 96/96; 96/108; 260/79.3 MU; 260/85.5 ZA; 260/85.5 S; 427/132
[51] Int. Cl.² .................. C08F 13/00; C12G 1/00; G03C 1/86
[58] Field of Search ............... 260/898, 80 L, 79.3 R

[56] References Cited
UNITED STATES PATENTS

| | | | |
|---|---|---|---|
| 3,133,039 | 5/1964 | Davis ................................. | 260/45.5 |
| 3,322,734 | 5/1967 | Rees .................................. | 260/79.3 |
| 3,328,333 | 6/1967 | Dannelly ........................... | 260/30.4 |
| 3,734,897 | 5/1973 | Stoy ............................ | 260/79.3 MU |

*Primary Examiner*—Christopher A. Henderson, Jr.
*Attorney, Agent, or Firm*—Murray Schaffer

[57] ABSTRACT

New polymers and copolymers containing silver and/or copper, useful e.g. in manufacturing dialysis and filtration membranes, ion exchangers, light sensitive layers, catalysts and hydrophilic coatings, are prepared from copolymers or polymer mixtures containing both nitrile groups and strong acidic groups, by bringing them in contact with monovalent silver or copper ions or with their mixtures. Silver and/or copper are attached to nitrile groups by secondary valences, thus forming complex compounds. The probable formulae of the complex groups are: $-CN.Ag^+$ or perhaps $-CN.Ag^+.NC-$ and $-CN.Cu^+$ or perhaps $-CN.Cu^+.Cu^+.NC-$, the complex cations forming polymeric salts with strong acidic groups of the same or of an adjoining macromolecule, to which all said nitrile and strongly acidic groups are attached as substituents.

4 Claims, No Drawings

POLYMERS CONTAINING SILVER AND COPPER

This application is a division of Ser. No. 114 008, filed Feb. 9, 1971 now U.S. Pat. No. 3,734,897, issued on May 22, 1973, which itself was a continuation of Ser. No. 729 897, filed May 17, 1968, now abandoned.

Polymers and copolymers forming starting materials for the new complex polymeric compounds are mainly derived from acylonitrile or methacrylonitrile and from ethylene sulfonic or styrene sulfonic acid, said monomers forming either copolymers or mixtures of homopolymers.

Copolymers of this kind were known. It was not known, however, that they can form complex compounds with silver and monovalent copper having new and in many respects outstanding properties. There were known only chelates of silver and copper ions with polymers having iminodiacetic groups (so called IDE-resins, see e.g. R. Hering, Chelatbildende Ionenaustauscher, Akademie-Verlag Berlin 1967, page 91–93).

There was also known a method of dyeing polyacrylonitrile fibers with acid dyestuffs in the presence of monovalent copper salts — "Sandocryl" and other processes. In said processes, the strongly acidic groups were attached to dyestuff molecules only, not to macromolecules of the same or another polymer. Complex-bound dyestuff molecules were concentrated mainly near the surface of the fiber and the properties of the fiber other than the color remained unchanged. Although the said dyeing method was known for many years, the affinity of cuprous ions to nitrile groups was not utilized for other purposes than dyeing. The possibility of using silver ions for modifying polymers having nitrile groups was apparently not studied at all.

Although any polymer or copolymer having nitrile side groups may be used for the purpose of the invention, e.g. methacrylonitrile or vinylidene cyanide polymers, acrylonitrile polymers and copolymers are preferred since they are more accessible, less expensive and more strong and stable than others. Among the strongly acidic groups, sulfonate groups are preferred for similar reasons, although they can be replaced by acid sulfuric ester groups $-O.SO_3H$ or by phosphoric ester groups such as $-O.PO_3H_2$, if desired. Generally, all strongly acidic groups used in ion exchangers may be employed for the purpose of the invention, but sulfonic acid groups, attached to a carbon atom of either the main chain or a side group, appear to be most useful at the present time.

The reaction between monovalent silver or copper ions and polymeric systems containing nitrile and strongly acidic groups takes place preferably in aqueous media, but it is possible to use any medium in which said polymeric system either swell or dissolve, and in which said metal cations can exist in sufficient concentrations. Like other ionic reactions, the forming of the present complex compounds is rapid, provided that the polymeric system is either dissolved or highly swollen so that the diffusion of metal ions is not seriously hindered.

The polymeric systems containing both nitrile and strongly acid groups may be either copolymers having groups of both kinds on the same macromolecule, or mixtures of polymers, each polymer containing groups of one kind only, or, at least, groups of one said kind in a prevailing amount. Mixtures of different copolymers can also be employed. Moreover, the copolymers may contain also other monomer units such as acrylamide or methacrylamide units for better solubility or cross-linking with covalent bonds by means of bifunctional compounds capable of reacting with amidic sidegroups.

Suitable mixtures of homopolymers include a mixture of polyacrylonitrile and polystyrene sulfonic or polyethylene sulfonic acid or their salts respectively in a common solvent such as concentrated nitric acid.

If copolymers are formed acrylonitrile and the sodium salt of either ethylene sulfonic acid (vinylsulfonic acid) or styrene sulfonic acid are the preferred monomers. The copolymerization is carried out in solvents capable of dissolving all monomers present. It is also advantageous, in some cases, although not necessary to use solvents capable of dissolving not only the monomers, but also the copolymer formed. Such common solvents for both monomers and the copolymer are concentrated aqueous solutions of zinc chloride, or aqueous dimethylformamide. If the acidic monomer prevails, it is possible to use water as a common solvent. Into this way, a rather concentrated aqueous copolymer solution, suitable for further treatment, can be obtained immediately by copolymerization. The economic advantages of water as a polymerization medium and copolymer solvent are obvious. Another advantage is the very low transfer constant of water, causing higher average molecular weight. Another advantage of water is the possibility of using redox polymerization catalysts or initiators for copolymerization at comparatively low temperatures, whereby the chain transfer onto the monomers and copolymer is slowed down. Concentrated aqueous zinc chloride solutions possess also the two last mentioned advantages, but zinc ions are very difficult to remove.

Aqueous dimethylformamide or dimethylsulfoxide solutions have the disadvantage of a comparatively high chain transfer constant, but this can be partly avoided by using redox catalysts and low temperatures. Generally, the average molecular weight of copolymers prepared in said solvents is comparatively low. Nevertheless, said solvents are very useful if the monomer bearing nitrile groups prevails.

Ionic bonds between cationic nitrile-silver or nitrile-copper groups and strong acidic groups particularly the intermolecular ones, cause ionic cross-linking. Moreover, the reaction of nitrile groups with silver or copper ions and the formation of polymeric inner complex salts causes considerable shrinking of the swollen copolymer. As a result, the strength of the copolymer increases. Since ionic cross-links can be broken and then restituted without activation energy, they do not hinder, in contradistinction to covalent cross-links, molecular orientation by stretching. This is important since copolymers with many strongly acidic groups swell considerably in water, whereby their tenacity is impaired. Thus, they cannot be stretched in the swollen condition. In the dry condition, they are brittle and cannot be stretched except at rather high temperatures. If treated with silver or monovalent copper ions, such copolymers can be easily stretched while wet, whereby their strength and size stability are enhanced. The silver or copper ions may be removed after stretching, and the original copolymer recovered in a state of high molecular orientation, e.g. in the form of a membrane or fiber. Surprisingly, the orientation is at least partly maintained together with improved size stability at different ionic concentrations. In other word, the linear swelling and shrinking of the copolymers is substantially reduced.

Silver-bearing polymeric compounds according to the invention are light-sensitive and can be used either directly or after having been reacted with halide ions for photography, printing and related industries.

The silver- or copper containing polymer compounds can be employed in coatings for ships and other articles immersed permanently in water. They are smooth and resist many undesired organisms.

Polymeric systems (copolymers or polymer mixtures) with both nitrile and strong acid groups are able to collect silver and/or cuprous ions even from very dilute solutions, such as waste waters. Thus, such waste waters can be utilized for preparing the metal containing polymers according to the invention, while simultaneously recovering the metals from waste liquors which are otherwise discarded. Silver ions are caught quantitatively.

In the form of membranes, grains or fibers the new silver and/or copper containing polymers can be employed for filtration, as ion exchangers, catalysts, for the artificial ageing of spirits, wine and other beverages etc.

With prevailing acidic groups the new polymers can be used as cation exchangers. With prevailing nitrile groups, they have properties of anion exchangers.

Other fields of use are dialysis, electrodialysis, fuel cells and other.

Membranes from the new polymers, when used for filtering aqueous solutions, reject large molecules and particles without being blocked thereby. Small molecules such as water or small ions can penetrate through such membranes. If there are no large molecules or particles present which could clog pores, it is possible to use membranes or other forms of the new polymers having visible porosity or macroporosity.

Polymers and copolymers used as starting material containing strong acid groups swell in water and aqueous solutions, and partly also in some polar solvents such as methanol and dimethylformamide. A high content of strong acid groups makes the copolymers water-soluble. Linear copolymers having so high a content of nitrile groups that they are not water-soluble can be dissolved in aqueous solvent mixtures, e.g. in a dimethylformamide — water or dimethylsulfoxide — water mixture. The swelling capacity of copolymers decreases with decreasing amount of strong acid groups.

Silver and copper in polymer complexes according to the invention are comparatively strongly bound: E.g. silver cannot be removed with 20% nitric acid. Silver is bound more firmly than copper. The silver complex is not decomposed by 20% aqueous ammonia, while the copper complex forms the known dark blue complex solution.

Strong reducing agents form dispersions of the two metals in the polymer. They can then be dissolved e.g. in mineral acids — nitric acid for silver or hydrochloric acid for copper. Polymer silver complexes react with halide ions, forming insoluble silver halides which are finely dispersed in the swollen polymer. The grain size of the silver halides can be increased or decreased by maintaining the polymer in the swollen condition for an extended period of time with or without peptizing agents, as is known in the manufacture of photographic light-sensitive material. In order to increase the light sensitivity, some gelatine solution can be added to the polymer solution before casting and treating with silver and halide ions. Usual sensitizers can be added as well.

Copolymers of acrylonitrile or methacrylonitrile with ethylene sulfonic or styrene sulfonic acid or with their soluble salts respectively are in many respects similar to native gelatine, particularly if acrylamide or methacylamide is added as a third monomer. Their properties may be adjusted by choosing a suitable ratio between the monomers, and subsequent hardening by means of formaldehyde is possible. Highly uniform light sensitive layers can be produced by coating paper, glass, plastic films or foils with said copolymers, treating them with silver ions, removing the excess thereof, and treating them again with halide ions. Preferably, after removing excessive halide solution, the material is then treated again with silver ions, washed, and dried so that the light sensitive layer is composed of a silver halide dispersed in the silver polymer complex.

Membranes can be manufactured not only by casting, as disclosed above, but also by extruding a viscous solution of a copolymer or polymer mixture, having both nitrile and strong acid groups, into a coagulating bath containing silver or cuprous ions. The same method is also suitable for fibers. Membranes or fibers leaving the coagulating (spinning) bath are then thoroughly washed and stretched, in order to obtain planar or linear molecular orientation.

Any of the methods mentioned above can be used also for manufacuring compound or bipolar membranes, consisting of two inseparable layers, one of them having prevailing nitrile groups and the other an excess of strong acid groups. If such compound membranes are treated with silver or cuprous ions, they display different electrochemical properties on both sides.

The invention will be further illustrated by the following Examples.

EXAMPLE 1

Concentrated aqueous zinc chloride solution ($d = 1.95$ was gradually added to 2 mols of acrylonitrile and 1 mol of sodium ethylenesulfonate (the latter in the form of a 50% aqueous solution), until the two monomers were uniformly dissolved. A redox polymerization catalyst was then added in the form of 5 percent aqueous solutions of potassium pyrosulfite and ammonium persulfate (0.1% of each, on the total weight of the monomers). Finally, 0.0001% of copper sulfate — pentahydrate (in the form of an 0.1% aqueous solution) was added as polymerization activator. The somewhat turbid solution was left to polymerize under carbon dioxide at room temperature. Next day the viscous copolymer solution thus obtained was poured in a thin stream into a vigorously stirred water solution containing 0.2% of hydrochloric acid. The fibrous, swollen coagulate was then repeatedly washed in 0.5% nitric acid, and water. Excess water was removed by filtering under suction and the copolymer was mixed, without being dried, with a threefold volume of dimethylformamide. After 3 hours of stirring at 60° C the almost clear solution was filtered. It contained about 5% of the copolymer. The still hot solution was degasified by applying a vacuum and poured on an exactly horizontal polished plate glass in a 2 mm layer. By slowly evaporating the solvents a hard, clear membrane was obtained which could be easily removed from the glass when moistened with water. The membrane was repeatedly washed in 0.5% nitric acid, in water, in a 1% aqueous solution of disodium salt of ethylenediamine tetra-acetic acid and again in water. Finally, the pure membrane was immersed in a 0.2N silver nitrate solution. The membrane shrank thereby and became opaque and greyish white. After washing out of the excess of silver nitrate the membrane, having increased tenacity, could be used e.g. for filtering or dialysis. It could be easily stretched, whereby its tenacity was further increased.

Silver could be removed from the membrane in an aqueous solution of sodium thiosulfate. The membrane was then more swellable than prior to the removal of silver, but considerably less swellable than the original unoriented membrane. The difference of length caused by shrinking in 0.1 N nitric acid and swelling in pure water, which was 150–215% in the case of the unoriented membrane, decreased to about 10% after the reaction with silver nitrate and rose to about 20–40% after the orientation and removal of silver.

EXAMPLE 2

A cell was formed comprising a U-shaped wire of 0.8 mm bounded by two pieces of plate glass. Three sides of the cell were immersed for a moment in a melt of bee-wax and stearine (at a 1:1 ratio). After a little while the wax mixture solidified and a flat mold, open on one side and having a thickness of 0.8 mm was obtained. The mold was filled with a monomer mixture at 10° C through a flat funnel made from polyethylene foil. The monomer mixture consisted of 10 ml of a 50% aqueous solution of sodium ethylene sulfonate, 4 ml of acrylonitrile, one drop of ethylene glycol bis-methacrylate and 8 ml concentrated aqueous zinc chloride solution ($d = 1.98$). Immediately prior to casting, polymerization was initiated with 5 drops of an aqueous 5% potassium pyrosulfite solution and with the same amount of ammonium persulfate. Gas bubbles were removed by knocking the mold. The mold was then left standing at 15° C. The gel point was reached in about 20 minutes, and after 3 hours the copolymerization was finished. The wax layer was cut away, and the mold was carefully opened under water. The copolymer foil thus obtained was initially highly plastified with zinc chloride solution, and was then washed consecutively in 0.5% nitric acid, water, 5% citric acid and again in water. Last it was immersed into a 5% silver nitrate solution and then washed again. The membrane thus obtained had similar properties like that in Example 1, except that it was less extensible and more elastic, due to the cross-linking caused by the small amount of added glycol bis-methacrylate.

EXAMPLE 3

An 10% copper sulfate solution was reduced with hydroxylamine sulfate and powdery copper was added. A membrane prepared according to Example 2 was immersed in the solution thus obtained which contained cuprous ions. After 3 hours, the membrane was washed in water. It was substantially tougher and stronger than before, and the swelling capacity was decreased similarly as when treated with silver ions. The membrane had a weakly greenish color which did not disappear after protracted washing in water.

EXAMPLE 4

A water-soluble copolymer of acrylonitrile, acrylamide and ethylene sulfonic acid was prepared in the following way: 57.5 g of an aqueous 47% solution of sodium ethylene sulfonate, stabilized against polymerization by 0.2% sodium nitrite, was destabilized by adding 3 g urea and acidified with concentrated hydrochloric acid to pH 2. The developing gases were repeatedly drawn off. 7.1 g Acrylamide and 13.6 ml acrylonitrile were added and the monomer mixture was dissolved in 76 ml of oxygen-free water. 1 ml of a 5% sodium pyrosulfite solution and the same amount of ammonium persulfate were stirred in, and the somewhat turbid solution was left standing under carbon dioxide at room temperature for 24 hours. The viscous solution thus obtained was poured into 2 liters of anhydrous ethanol. The white coagulate was purified by dissolving it in water and again precipitating it in anhydrous ethanol, broken to small pieces and dried at 70° C.

A 20% solution of the copolymer in water was cast on a horizontal plate glass and the solvent was slowly evaporated. The dry layer was treated with 37% aqueous formaldehyde solution, acidified with 0.2% hydrochloric acid, for 2 hours at room temperature. The formaldehyde solution was then removed, the membrane washed with water, in which it was insoluble as a result of cross-linking with formaldehyde, and cut into two pieces. One was left in water as a control, the other was treated 5 minutes in a 5% silver nitrate solution and washed. The silver nitrate treated membrane shrank considerably, was opaque, and its strength was increased.

EXAMPLE 5

Free polyethylene sulfonic acid, obtained by treating neutral sodium polyethylene sulfonate solution in a column filled with a strongly acid cation exchanger, was mixed with an equivalent amount of silver nitrate. The solution was precipitated with a 5% solution of polyacrylonitrile in dimethylformamide. The wet precipitate — a polymeric salt of polyethylene sulfonic acid with a polyacrylonitrile-silver-complex polycation — is a soft, greyish white plastic which can be mechanically shaped and at least partly oriented. In the dry condition, the mass is hard and brittle; it can be ground to a powder which can be mixed with plasticizers and molded at elevated temperatures.

A similar plastic is obtained by using monovalent copper ions instead of silver.

EXAMPLE 6

Dry powdered polyacrylonitrile was dissolved in a known manner in concentrated cold nitric acid (65 weight percent) at 10°–15° C. An 8% solution was obtained. Dry sodium polyethylene sulfonate was also dissolved in concentrated nitric acid to form a 10% solution to which an equivalent amount of normal silver nitrate solution was added. When the two clear solutions were mixed, a white precipitate was formed and was thoroughly washed in water. It had similar properties as the product obtained according to Example 5.

EXAMPLE 7

A membrane prepared according to Example 1 was treated with silver nitrate solution, washed, and immersed in a 5% ammoniacal solution of hydrazine sulfate. It turned brownish black due to precipitated metallic silver. During subsequent washing with water, the membrane swelled considerably since the silver complex was decomposed. By treating the membrane again in a 1% silver nitrate solution for 1 hour the membrane shrank again and lost its high swelling capacity. The membrane was suitable for filtering water, wine and other beverages under simultaneous sterilization and artificial ageing. Without second treatment with silver nitrate the polymer had very low oligodynamic activity since silver ions, liberated by metallic silver, are readily caught by free nitrile and sulfonic groups.

EXAMPLE 8

A copolymer solution in aqueous dimethylformamide prepared according to Example 1 was evaporated to 11% dry substance, filtered, degasified and spun through a spinneret with 0.2 mm holes into a spinning bath containing 5% of silver nitrate. The filaments were washed in hot distilled water and stretched. Then they were cut to staple fibers. Metallic silver was liberated according to Example 7 and the washed fibers were treated with silver nitrate again and washed. They were very suitable for filtering and for other purposes mentioned in the foregoing Example.

EXAMPLE 9

The process according to Example 6 was repeated using polystyrene sulfonic acid instead of polyethylene sulfonic acid. Polystyrene sulfonic acid was obtained by careful sulfonation of linear polystyrene with sulfuric acid, using silver sulfate as a catalyst. Concentrated nitric acid must be carefully cooled when dissolving polystyrene sulfonic acid therein, in order to avoid excessive nitration. The greyish white precipitate had similar properties as those prepared in Example 6 or 5.

EXAMPLE 10

A 10% polyacrylonitrile solution (average molecular weight 55 000) in cool concentrated nitric acid was mixed with a 10% solution of sodium polyethylene sulfonate in the same solvent. The clear solution was extruded through a slit into a 10% aqueous silver nitrate solution. The polymer solution coagulated to a white opaque membrane which could be calendered in the wet condition. It was suitable for filtering under pressure.

EXAMPLE 11

A smooth-edged flask was filled with a silver acetate solution and tightly covered with a foil of regenerated cellulose 0.5 mm thick. Then it was turned over and immersed with the foil down in a solution of a copolymer of acrylonitrile with sodium ethylene sulfonate (molar ratio 1.5 : 1) in aqueous dimethylformamide. Penetrating silver ions coagulated the copolymer solution forming thus a porous membrane. The nature of the product could be changed by changing the concentration of the silver nitrate solution, the temperature, the thickness and permeability of the foil and the concentration of the copolymer solution.

EXAMPLE 12

A copolymer solution in aqueous dimethylformamide, prepared according to Example 1, was evaporated to 11% of dry substance and used, still warm, for coating blank photographic paper. The coated paper was treated in the absence of actinic light for 10 minutes with a 5% aqueous silver nitrate solution and then thoroughly washed in distilled water, and dried. When exposed to actinic light under a photographic negative (about 5 minutes disperse daylight), the paper could be developed with usual developing agents and fixed with a sodium thiosulfate solution. The picture was violet-brown.

EXAMPLE 13

The silvered and washed paper prepared according to Example 12 was treated with 0.1 N potassium bromide solution, containing 1% of potassium chloride and 0.1% potassium iodide on the total weight of halides. The paper was then kept for 1 hour at 30° C. in a sodium hydrocarbonate solution at pH 7.5–8. The washed and dried paper had higher light sensitivity than that prepared according to Example 12.

EXAMPLE 14

The process according to Example 13 was repeated with a copolymer of increased swelling capacity (sulphur content 7%), containing 5 mol percent of acrylamide being used. 5% Gelatine (on the weight of the copolymer) was added in the form of a warm aqueous solution prior to coating the paper. The paper was dried and hardened with gaseous formaldehyde, washed, treated with a 5% silver nitrate solution, washed again, treated with halide solution as in Example 13, washed in water, treated once again with a 5% silver nitrate solution, thoroughly washed and dried. It had still higher light sensitivity than that prepared according to Example 13.

EXAMPLE 15

The membrane prepared according to Example 1, yet containing neither silver nor monovalent copper, was cut into small strips and used for filling a small laboratory column, through which a very dilute (about 0.003%) silver nitrate solution — waste water from washing fibers according to Example 8 — was passed. When 80% of the theoretical column capacity was utilized, silver was quantitatively fixed. Theoretical capacity in this case means the equivalent of those active groups (either nitrile or sulfo), which are present in a smaller amount.

EXAMPLE 16

A complex base, containing complex cations $—CN.Ag^+$ or $—CN.Cu^+$, which cations are neutralized by anions of simple mineral acids such as $NO_3^-$, can be also prepared separately and then reacted with another polymer bearing strongly acidic groups such as $—SO_3$.

polyacrylonitrile (average molecular weight 55 000) was dissolved in concentrated nitric acid (65% $HNO_3$, 15° C) to form a 10% solution. The solution was extruded through a 0.4 mm hole into a stirred 10% solution of silver nitrate in concentrated nitric acid. The precipitate, containing complex cations $—CN.Ag^+$ on the polymeric chain and free anions $NO_3^-$, was washed in water neutrality. It formed a greyish white plastic which was hot-calendered to a 0.5 mm thick sheet. Onto this sheet, a solution of acrylonitrile-ethylene sulfonic acid copolymer, insoluble in water but soluble in aqueous dimethylformamide and dissolved therein, was poured in a uniform layer, and the solvent was evaporated. The two layers were firmly bound by ionic cross-links between complex silver cations and sulfonic groups. The bipolar membrane thus obtained could be used for building the oxygen side of a fuel cell. For this purpose, it is desirable to reduce silver complex cations first formed with an effective reducing agent such as hydrazine hydrate, and then to reconstitute the complex silver cations by treating the polymer again with silver nitrate or silver acetate solution as described in Example 7.

The free complex base can be obtained by washing the first prepared nitrate (see above) with diluted aqueous ammonia.

What is claimed is:

1. A method for preparing a water-swellable polymeric composition having bound thereto a monovalent metal cation selected from the group of copper and silver which comprises contacting two different kinds of polymers, one polymer carrying nitrile radicals derived from ethylenically unsaturated nitrile monomers and the other of said polymers carrying sulfo radicals derived from ethylenically unsaturated sulfo monomers, with an aqueous solution of a salt of said metal cation for a period of time sufficient to form a complex between the metal ions and said polymeric composition, said solution containing said metal ions in an amount which is at least substantially equivalent to the sulfo groups present.

2. A method as defined in claim 1, wherein said contacting is carried out in nitric acid.

3. A method as defined in claim 1 wherein the concentration of said metal ions is higher than the concentration of sulfo groups.

4. A method as defined in claim 1 wherein said sulfo radicals are derived from ethylenesulfonic acid or styrenesulfonic acid and said nitrile radicals are derived from acrylonitrile.

* * * * *